United States Patent [19]
Yang

[11] Patent Number: 5,493,186
[45] Date of Patent: Feb. 20, 1996

[54] SUB-EXITER CONTROL FOR THE SERIES WINDING OF A SERIES-TYPE OR COMPOUND DC MOTOR OR GENERATOR

[76] Inventor: Tai-Her Yang, 5-1 Taipin St., Si-Hu Town, Dzan-Hwa, Taiwan

[21] Appl. No.: 87,256

[22] Filed: Jul. 8, 1993

[51] Int. Cl.⁶ .................................................. H02K 23/64
[52] U.S. Cl. .................... 318/245; 318/440; 318/140; 318/493; 318/494; 318/530
[58] Field of Search ................................. 318/245, 440, 318/140, 493, 494, 530

[56] References Cited

U.S. PATENT DOCUMENTS

| | | | |
|---|---|---|---|
| 3,311,802 | 3/1967 | Schenk | 38/530 |
| 3,398,344 | 8/1968 | McCormick | 318/245 |
| 4,284,932 | 8/1981 | Kawada et al. | 318/493 |
| 4,613,805 | 9/1986 | Matsuo et al. | 318/440 |
| 4,724,367 | 2/1988 | Nohmi et al. | 318/245 |
| 5,168,207 | 12/1992 | Follmer | 318/140 |
| 5,268,987 | 12/1993 | Sakoh | 318/245 |

Primary Examiner—William M. Shoop, Jr.
Assistant Examiner—Karen Masih
Attorney, Agent, or Firm—Bacon & Thomas

[57] ABSTRACT

Sub-excitation of a series-type excitation magnetic field winding for a DC motor or generator is provided by an auxiliary power supply which, when the voltage in the main circuit is low, supplies voltage through a diode to the main series field winding in order to keep the voltage at or near saturation and thereby improve motor efficiency.

2 Claims, 1 Drawing Sheet

SUB-EXITER CONTROL FOR THE SERIES WINDING OF A SERIES-TYPE OR COMPOUND DC MOTOR OR GENERATOR

SUMMARY OF THE INVENTION

The overall efficiency of a conventional series or compound armature tends to be low during voltage-doubling, especially at low voltages, because of the dropping of the excitation current in the absence of a sufficient magnetic field intensity. The present invention overcomes this shortcoming by providing sub-exciter control of the magnetic field of a DC series type excitation or compound generator and motor, and in particular by increasing the magnetic field intensity during low voltage or under-load operation without sufficient excitation and by performing normal excitation when the load is a full load, in order to attain saturated excitation or nearly saturated excitation under either a full load or light load voltage to raise the efficiency in the low voltage range. This is accomplished by:

(1) Performing sub-exciter control of the field generated by the series type excitation winding by means of an auxiliary magnetic field power supply for the motor. The auxiliary magnetic field power supply augments the current present in the series winding upon a reduction in the excitation current of the series type excitation winding.

(2) The auxiliary magnetic field power supply also is used to increase the current present in the series type excitation winding upon a reduction in the excitation current in the series type excitation winding of a compound motor.

The above functions result in a constant or approximately permanent intensity magnetic field by reducing the sub-exciter when the excitation current of the series type excitation winding increases, and increasing the sub-exciter to raise the efficiency of the low voltage section upon voltage doubling at a light load.

Consequently, the present invention provides the advantages of a conventional separately excited dynamo in normal operation, including the features of low starting current and high torque possessed by the series type excitation motor, and avoids the disadvantages of insufficient excitation of the magnetic field resulting in the dropping of efficiency of the series type excitation motor during low voltage operation and a non-full load. Those skilled in the art will appreciate that the above principles are applicable to both generators and motors.

DETAILED DESCRIPTION OF THE INVENTION

As is well-known, a series type excitation motor provides the features of good starting at high loads, with a relatively small current providing a relatively high torque. However, in the case of a motor, the torque must be proportional to the magnetic field strength at low speed, and in the case of a generator, the generating voltage must be proportional to the intensity of the magnetic field at a low voltage output, or the efficiency will be low during low voltage driving or motor or low voltage output by the generator. To overcome this shortcoming, the present invention performs sub-exciter control on the series type excitation magnetic field winding of a DC series type excitation or compound dynamo (including both a generator and a motor), in order to increase the magnetic field by means of the sub-exciter control at low voltages or during light load operation, while providing for normal excitation when the load is full to cause saturation or near saturation under various voltages with both light and full loads to improve efficiency.

Figure 1:
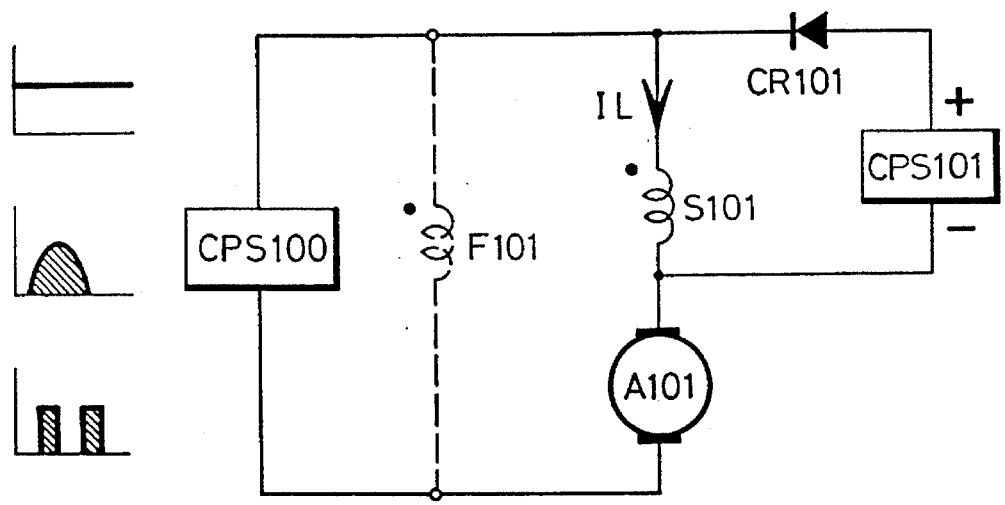
FIG. 1 is a diagram showing a motor with a series winding and an auxiliary field power supply according to a preferred embodiment of the invention.

As shown in FIG. 1, a preferred series type motor includes a series type excitation winding S101 and armature A101 connected in series or, in the case of a compound DC motor, a parallel type excitation magnetic field winding F101.

Power supply CPS100 is the main DC power supply for driving the motor, and may include a storage power element, generator, solar energy converter, or a fixed voltage or adjustable voltage DC power supply obtained by rectification of an AC power supply.

Those skilled in the art will appreciate that in the case of a generator, armature 201 will be driven by an external mechanical power source to generate a current by the magnetic coupling between armature A101, which forms a generator armature, and series winding S101 in order to supply current to a load or generator output circuit represented by block CPS100 in FIG. 1.

A sub-exciter power supply CPS101 is connected in series with a blocking diode CR101 in parallel with the two ends of the series type excitation winding S101, to directly perform auxiliary excitation of the series type excitation winding either during power generation or use as a motor, the direction of the voltage of the sub-exciter always being in parallel with and of the same polarity as the series type excitation magnetic field winding voltage drop. The sub-exciter power supply may include a storage power element, generator, solar energy converter, or a fixed voltage or adjustable voltage DC power supply obtained by rectification of an AC power supply.

The system control is such that the voltage drop at the two ends of the series type excitation winding S101 preferably increases when the load current IL increases, the voltage drop being inversely proportional to the sub-exciter power supply—the bigger the load current, the smaller the current of the sub-exciter, and the smaller the load current, the larger the current of the sub-exciter.

Figure 2:
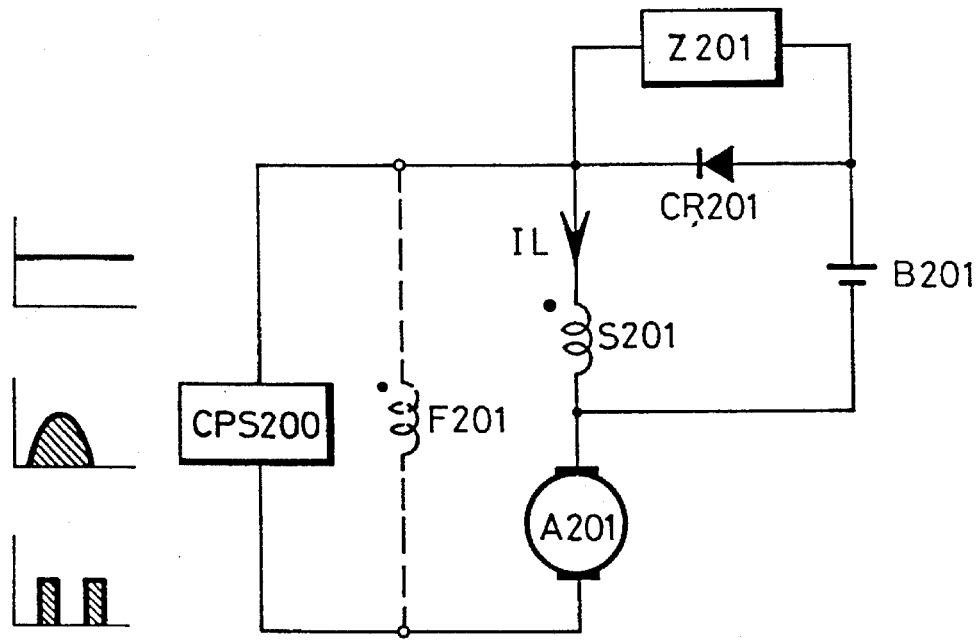
FIG. 2 is a diagram of a further preferred embodiment of the invention shown in FIG. 1.

FIG. 2 shows an embodiment of the circuit shown in FIG. 1, in which use is made of an auxiliary storage battery (or other storage element) as the auxiliary power supply, and which further includes a series type excitation motor having a series-connected excitation winding S201 and armature A201, and additionally, in the case of a compound DC motor, a magnetic shunt field winding F201 connected in parallel with the series winding and motor.

A main power supply CPS200 provides DC power to drive the motor and may include a storage power element, generator, solar energy converter, or a fixed or adjustable voltage DC power supply obtained by rectification of an AC power supply. Again, those skilled in the art should appreciate that in the case of a generator, the armature A201 serves as a generator armature which is mechanically driven by an external power source and the circuit supplies current, by means of the magnetic coupling between armature A201 and series field winding S201, to a load or generator output circuit represented by block CPS200.

A sub-exciter storage battery B201 is connected in series with the blocking diode CR201 and in parallel with the two ends of the series type excitation winding S201 to perform sub-excitation on the series type excitation magnetic field winding. The direction of the voltage of the sub-exciter is always parallel and has the same polarity as the voltage drop of the series type magnetic field winding in either a generator or a motor application.

In this embodiment, charging current adjusting element Z201, made up of an electromechanical or solid state voltage regulation circuit, or a blocking resistor, causes the storage battery to accept a charge when the value of the voltage drop of the series type excitation magnetic field winding S201 exceeds that of the voltage of the auxiliary storage battery B201.

The voltage drop at the two ends of the series type excitation winding S201 increases when the load current IL increased, the polarity of the voltage drop being in an opposite direction relative to that of the sub-exciter power supply, so that the bigger the current of the load, the smaller the current of the sub-exciter, and the smaller the current of the load, the larger the current of the sub-exciter.

The functions of the circuit shown in FIG. 2 are:

(1) For a motor having a series type excitation winding, sub-exciter control of the series type excitation winding is performed using an auxiliary magnetic field battery to increase the current in the series type excitation winding at low voltages, and to otherwise reduce the current of the series type magnetic field when the excitation current of the series type winding increases.

(2) When the current in the series type excitation winding of a compound motor is reduced, the excitation current of the series type winding is increased by means of the auxiliary magnetic field battery; and when the current is increased, the preferred sub-exciter responds by reducing the current.

In the above method, when the excitation current of a series type winding increases, the current in the sub-exciter is reduced; otherwise when the excitation current of the series type winding is reduced, the current in the sub-exciter is increased to obtain a magnetic field with a constant or approximately permanent intensity in order to raise the efficiency at low voltages and loads.

I claim:

1. In a circuit for controlling a motor, comprising:

a power supply, an armature, and means including an excitation field winding connected in series between the power supply and the armature for generating a magnetic field which causes the armature to rotate, the improvement comprising:

auxiliary power supply means and a diode connected in series with each other and in parallel with the series field winding, said auxiliary power supply means being for supplying a voltage to the field winding in order to cause the field winding to maintain a substantially constant magnetic field, wherein the auxiliary power supply is a battery, and further comprises means for charging the battery when the voltage across the field winding exceeds a predetermined level in order to keep the voltage constant.

2. In a circuit for outputting current from a generator armature to a generator output, comprising:

a field winding constituting means for generating a current in said armature in response to magnetic coupling between the armature and the field winding, and said field winding, armature, and generator output being connected in series, the improvement comprising:

auxiliary power supply means and a diode connected in series with each other and in parallel with the field winding, said auxiliary power supply means being for inducing a voltage across the field winding in order to cause the field winding to output a substantially constant voltage, and further comprising means for charging a battery when the voltage across the field winding exceeds a predetermined level in order to keep the voltage constant.

\* \* \* \* \*